(12) United States Patent
Shimuta

(10) Patent No.: US 11,680,855 B2
(45) Date of Patent: Jun. 20, 2023

(54) ATTACHED MEMBER

(71) Applicant: Murata Manufacturing Co., Ltd., Kyoto (JP)

(72) Inventor: Toru Shimuta, Kyoto (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 495 days.

(21) Appl. No.: 16/781,319

(22) Filed: Feb. 4, 2020

(65) Prior Publication Data

US 2020/0249100 A1    Aug. 6, 2020

(30) Foreign Application Priority Data

Feb. 6, 2019 (JP) .............................. JP2019-020035

(51) Int. Cl.
| | |
|---|---|
| *A61M 25/02* | (2006.01) |
| *G01K 13/20* | (2021.01) |
| *G01K 1/14* | (2021.01) |
| *C09J 7/20* | (2018.01) |

(52) U.S. Cl.
CPC .............. *G01K 13/20* (2021.01); *G01K 1/14* (2013.01); *C09J 7/20* (2018.01); *Y10T 428/14* (2015.01)

(58) Field of Classification Search
None
See application file for complete search history.

(56) References Cited

U.S. PATENT DOCUMENTS

| | | | | |
|---|---|---|---|---|
| 4,917,928 | A | * | 4/1990 | Heinecke .............. A61F 13/023 428/130 |
| 7,027,877 | B2 | * | 4/2006 | Dupelle ................. A61N 1/046 607/152 |
| 2009/0000722 | A1 | * | 1/2009 | Bartusiak ................. B32B 3/08 156/60 |

FOREIGN PATENT DOCUMENTS

JP    H11-290465 A    10/1999

* cited by examiner

*Primary Examiner* — Anish P Desai
(74) *Attorney, Agent, or Firm* — Pearne & Gordon LLP

(57) ABSTRACT

An attached member includes: a strip-shaped peelable member being in film form; and a tab being in plate form. An adhesive surface of a deep body thermometer and the tab are attached respectively to regions being part of first and second main surfaces of the peelable member and corresponding to about halves of the peelable member on first and second end sides. With the peelable member being folded substantially along the midsection between first and second ends, the order of layers, from closest to the adhesive surface, is the peelable member, the tab, a double-sided tape, and the peelable member. The thickness of the tab is equal to or greater than twice the minimum bending radius at which the peelable member is elastically deformable. The tab extends in a folding direction of the peelable member and beyond an outer edge of the peelable member.

20 Claims, 11 Drawing Sheets

ATTACHED MEMBER

This application claims priority from Japanese Patent Application No. 2019-020035 filed on Feb. 6, 2019. The content of this application is incorporated herein by reference in its entirety.

BACKGROUND

The present disclosure relates to an attached member and, more specifically, to an attached member that is provided for an object for affixation to a living body. Various objects for affixation to a living body (stick-on devices for use on a living body) are proposed. Before such an object is used, or more specifically, is stuck on a body surface, a member such as a piece of release paper is to be peeled away from a sticking surface (adhesive surface) of the object.

Japanese Unexamined Patent Application Publication No. 11-290465 discloses a magnetic therapy device of the first-aid sticking plaster type. The magnetic therapy device of the first-aid sticking plaster type includes: a rectangular adhesive sheet base formed from polyurethane; and a rectangular magnetic material sheet bonded substantially to the midsection in the longitudinal direction of a bonding surface of the adhesive sheet. The magnetic material sheet is magnetized in such a manner that alternating south and north poles are aligned therein. The adhesive sheet base is provided with two pieces of release paper. First end portions of these pieces of release paper are removably attached to corresponding end portions of the bonding surface in the longitudinal direction of the adhesive sheet base. Second end portions of these pieces of release paper cover the magnetic material sheet.

To use the magnetic therapy device of the first-aid sticking plaster type, the user decides where to stick the device (e.g., a pressure point or site of pain on the surface skin) and then peels the two pieces of release paper away from the adhesive sheet base to stick the device on the target site.

In some cases, however, the user mispositions the device due to the need to peel off the pieces of release paper (peelable member) prior to affixation of the device. Repositioning of the device may cause a reduction in adhesive strength. With clothes on, the user may particularly find it difficult to slip a wearable object, for example, under the collar and to stick the object, without necessarily mispositioning, on the target site after peeling off the pieces of release paper.

BRIEF SUMMARY

The present disclosure provides an attached member including a peelable member easily peelable from an object positioned on a target site so that the object for affixation is reliably stuck on the target site.

An attached member according to embodiments of the present disclosure is attached to an adhesive surface of an object for affixation in such a manner as to cover the adhesive surface and be peelable from the adhesive surface. The attached member includes: a peelable member that is in film form and is strip-shaped; and a tab that is in plate form. The adhesive surface of the object for affixation is attached to a region being part of a first main surface of the peelable member and extending from a first end of the peelable member to a first predetermined position on the peelable member. The tab is attached to a region being part of a second main surface of the peelable member and extending from a second end of the peelable member to a second predetermined position on the peelable member. With the peelable member being folded along a region between the first predetermined position and the second predetermined position, the attached member seen from a side exhibits a layered structure in which the order of layers, from closest to the adhesive surface of the object for affixation, is the peelable member, the tab, and then the peelable member. The thickness of the tab is equal to or greater than twice the minimum bending radius at which the peelable member is elastically deformable. The tab extends in a folding direction of the peelable member and beyond an outer edge of the peelable member.

The attached member according to embodiments of the present disclosure includes: the peelable member that is in film form and is strip-shaped; and the tab that is in plate form. The adhesive surface of the object for affixation is attached to the region being part of the first main surface of the peelable member and extending from the first end of the peelable member to the first predetermined position on the peelable member. The tab is attached to the region being part of the second main surface of the peelable member and extending from the second end of the peelable member to the second predetermined position on the peelable member. With the peelable member being folded along the region between the first predetermined position and the second predetermined position, the attached member seen from a side exhibits a layered structure in which the order of layers, from closest to the adhesive surface of the object for affixation, is the peelable member, the tab, and then the peelable member. Owing to this configuration, the user can peel the peelable member away from the adhesive surface to stick the object for affixation to a target site just by pinching and pulling out the tab in a lateral direction while pressing down the object positioned on the target site. The thickness of the tab is equal to or greater than twice the minimum bending radius at which the peelable member is elastically deformable. This feature, in particular, eliminates or reduces the possibility that the peelable member will be elastically deformed while being peeled off. Thus, the peelable member may be peeled off with relatively weak force. The tab extends in the folding direction of the peelable member and beyond the outer edge of the peelable member. Owing to this feature, the user can easily pinch the tab.

Other features, elements, characteristics, and advantages of the present disclosure will become more apparent from the following detailed description of embodiments of the present disclosure with reference to the attached drawings.

DETAILED DESCRIPTION

Figure 1:
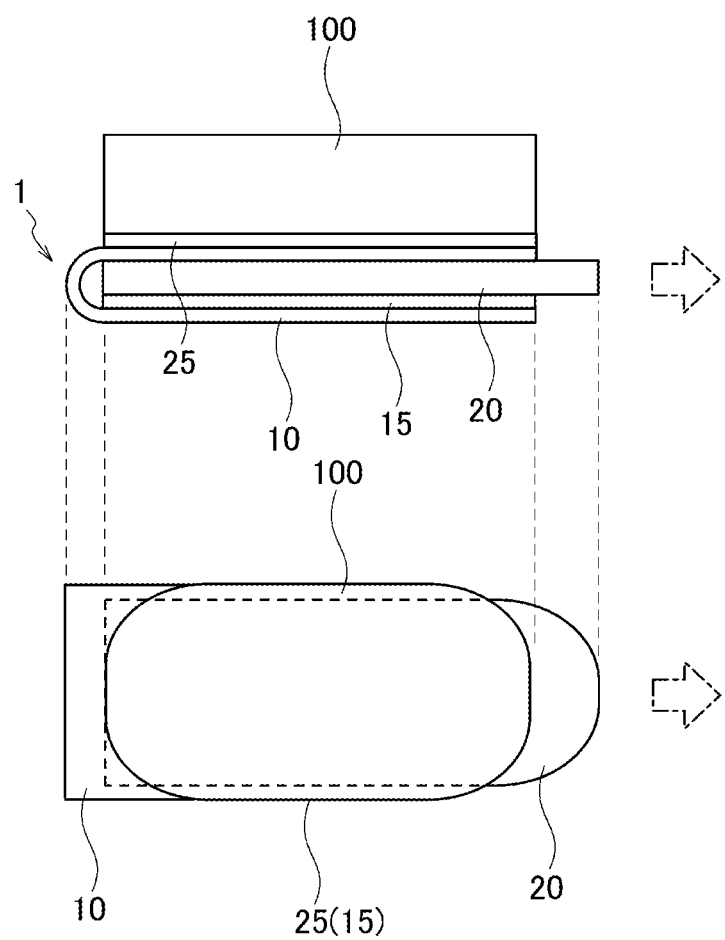
FIG. 1 includes a side view and a plan view of an attached member according to an embodiment of the present disclosure, illustrating the state in which a peelable member is folded over.

Embodiments of the present disclosure will be described below in detail with reference to the accompanying drawings. The same reference signs refer to the same or like parts throughout. A redundant description the same constituent components, which are denoted by the same reference signs in the drawings, will be omitted.

Figure 2:
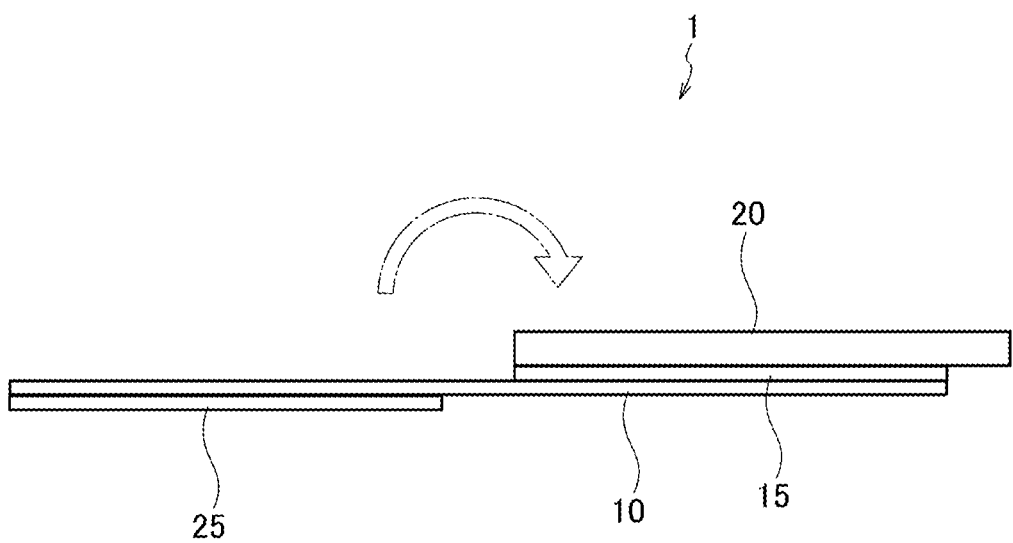
FIG. 2 is a side view of the attached member according to the embodiment, illustrating the state in which the peelable member is yet to be folded over.
Figure 3:
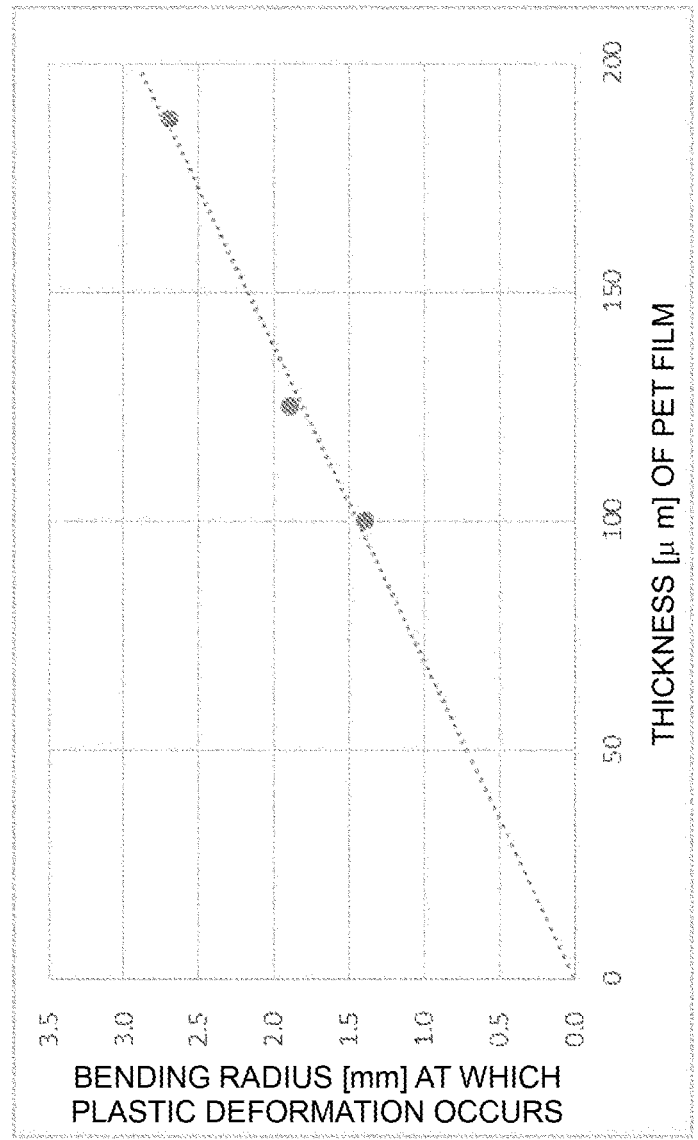
FIG. 3 is a graph illustrating the relationship between the thickness of the peelable member and the bending radius at which plastic deformation occurs.

Referring to FIGS. 1 to 3, the following describes a configuration of an attached member 1 according to an embodiment. The following describes an application example in which the present disclosure is provided for a stick-on deep body thermometer 100 (corresponding to "object for affixation" in the appended claims) that is to be stuck on a living body to measure the deep body temperature of the living body. FIG. 1 includes a side view and a plan view of the attached member 1, illustrating the state in which a peelable member 10 is folded over. FIG. 2 is a side view of the attached member 1, illustrating the state in which the peelable member 10 is yet to be folded over. FIG. 3 is a graph illustrating the relationship between the thickness of the peelable member 10 and the bending radius at which plastic deformation occurs.

The peelable member 10 is attached to an adhesive surface 25 of the deep body thermometer 100 during periods of nonuse of the deep body thermometer 100 (e.g., during keeping of the deep body thermometer 100 in storage). The attached member 1 is attached to the adhesive surface 25 of the deep body thermometer 100 in such a manner as to cover the adhesive surface 25 and be peelable from the adhesive surface 25. Use of the deep body thermometer 100 involves peeling the attached member 1 away from the adhesive surface 25 of the deep body thermometer 100 and sticking the adhesive surface 25 of the deep body thermometer 100 on a living body. The attached member 1 includes mainly the peelable member 10, a double-sided tape 15, and a tab 20.

The peelable member 10 is in film form and is strip-shaped. A material of low flexural rigidity and of high tensile strength can be used as the peelable member 10 to achieve a small bending radius. Materials such as polyethylene terephthalate (PET), polypropylene, acrylic, nylon, and polyimide are suited for use as the peelable member 10. For use as the peelable member 10, material in which high bending stress may be developed, that is, a rigid material may be formed into a thin sheet having reduced flexural rigidity. When being made from PET, the peelable member 10 may have a thickness of about 5 to 25 μm.

The adhesive surface 25 of the deep body thermometer 100 is attached to a region being part of a first main surface of the peelable member 10 and extending from a first end of the peelable member 10 to a first predetermined position on the peelable member 10 (corresponding to about one-half the peelable member 10 on a first end side in the present embodiment). For example, a biocompatible double-sided tape may be suited to the adhesive surface 25 of the deep body thermometer 100. A double-sided tape including a core made of a resin film can be used. The first main surface of the peelable member 10, to which the adhesive surface 25 of the deep body thermometer 100 is attached, can be coated with a silicone release agent so that the peelable member 10 is easily peelable from the adhesive surface 25 of the deep body thermometer 100.

The tab 20 is in the form of a thin plate. It is required that the tab 20 be high in rigidity and be resistant to deformation such as depression in the thickness direction. Resin materials whose Young's moduli are relatively great, namely, PET, polypropylene, acrylic, polycarbonate, ABS, nylon, and polyimide are suited for use as the tab 20. Metal may be also used as the tab 20. The use of a thick material provides greater rigidity in the tab 20. When being made from PET, the tab 20 may have a thickness of about 100 to 750 μm.

More specifically, the thickness of the tab 20 is equal to or greater than twice the minimum bending radius at which the peelable member 10 is elastically deformable or resistant to plastic deformation. Pulling the tab 20 to peel off the peelable member 10 involves exerting force to bend and straighten the peelable member 10 in addition to force to separate the peelable member 10 from the adhesive surface 25. Thus, relatively strong force is required. When plastic deformation occurs in the peelable member 10, stronger force is required to straighten the peelable member. Meanwhile, when the thickness of the tab 20 is equal to or greater than twice the minimum bending radius at which the peelable member 10 is resistant to plastic deformation, the peelable member 10 may be peeled off with as much force as would cause no plastic deformation during the bending and straightening of the peelable member 10. Thus, the peelable member 10 may be peeled off with relatively weak force.

FIG. 3 illustrates the relationship between the thickness of the peelable member 10 and the bending radius at which plastic deformation occurs. In FIG. 3, which is a graph illustrating the relationship between the thickness of the peelable member 10 and the bending radius at which plastic deformation occurs, the horizontal axis represents the thickness of a PET film (μm) and the vertical axis represents the bending radius (mm) at which plastic deformation occurs. As graphed in FIG. 3, the radii at which plastic deformation occurred were measured while PET films varying in thickness were folded over. More specifically, each strip-shaped PET film having a width of about 10 mm was folded over to form a U-shape and was placed between a pair of flat boards arranged parallel to each other. With an end of the PET film being fixed to one of the flat boards, the flat boards were gradually brought closer to each other, and the bending radius at which plastic deformation occurred in the PET film was determined by measurement of the distance between the flat boards at the time of occurrence of the plastic deformation.

The results graphed in FIG. 3 confirmed that the thinner the PET film was, the smaller the radius at which plastic deformation occurred was. The slope of the graph tends to be steeper where a more rigid material, that is, a material whose Young's modulus and bending strength are greater is concerned.

The tab 20 is attached to a region being part of a second main surface of the peelable member 10 and extending from a second end of the peelable member 10 to a second predetermined position on the peelable member 10 (corresponding to about one-half the peelable member 10 on a second end side in the present embodiment). The tab 20 is attached with, for example, the double-sided tape 15 to the peelable member 10.

The adhesive force acting between the peelable member 10 and the adhesive surface 25 of the deep body thermometer 100 can be weaker than the adhesive strength of the double-sided tape 15, which corresponds to the adhesive force acting between the peelable member 10 and the tab 20. For this reason, a release agent can be applied between the peelable member 10 and the adhesive surface 25 of the deep body thermometer 100, that is, to the first main surface of the peelable member 10 as mentioned above. To adjust the degree of adhesion, the adhesive area may be increased or decreased or a different adhesive material may be used.

As described above, the adhesive surface 25 of the object for affixation is attached to the region being part of the first main surface of the peelable member 10 and corresponding to about one-half the peelable member 10 on the first end side, and the tab 20 is attached to the region being part of the second main surface of the peelable member 10 and corresponding to about one-half the peelable member 10 on the second end side. With the peelable member 10 being folded substantially along the midsection between the first end and the second end of the peelable member 10, that is, along a region between the first predetermined position and the second predetermined position, the attached member 1 seen from a side exhibits, as illustrated in FIG. 1, a layered structure in which the order of layers, from closest to the adhesive surface 25 of the deep body thermometer 100, is the peelable member 10, the tab 20, the double-sided tape 15, and then the peelable member 10.

With the peelable member 10 being folded over, the tab 20 is attached in such a manner as to extend in the folding direction (a direction parallel to the longitudinal side of the peelable member 10) of the peelable member 10 and beyond the first and second ends forming part of the outer edge of the peelable member 10. The length of the tab 20 can be substantially equal to or greater than the length in the folding direction of the peelable member 10 in the folded state. Substantially equal means that the length of the tab 20 can be up to 20% longer or shorter than the length in the folding direction of the peelable member 10 in the folded state. The width of the tab 20 can be substantially equal to the dimension of the peelable member 10 in the direction orthogonal to the folding direction of the peelable member 10.

For easy bending and straightening, the peelable member 10 is required to be less rigid. This may be achieved, as described above, through the use of a material whose Young's modulus is small or through a reduction in the thickness of the peelable member 10. When being less rigid, the peelable member 10 is more prone to wrinkle due to concentration of stress on the region pressed against the living body during peeling of the peelable member 10. When the tab 20 is smaller than the peelable member 10, in particular, stress concentrates on the region around the tab 20, making the peelable member 10 more prone to wrinkle. Furthermore, the peelable member 10 may not be bent uniformly or may not be peeled off uniformly. The width and the length of the tab 20 be substantially equal to the width and the length of the peelable member 10 in the folded state, respectively. The part to be pinched with fingers may be thicker than the remaining part of the tab 20.

To reduce the force (peel force) required to start peeling off the peelable member 10, four corners of the adhesive surface 25 of the deep body thermometer 100 are arc-shaped (by round chamfering), and the width of the adhesive surface 25 at a position adjacent to the folded section of the peelable member 10, where the peelable member 10 starts coming off, is thus less than the width of the adhesive surface 25 at the midsection thereof. With the peelable member 10 being folded over, peeling off the peelable member 10 requires force to bend and straighten the peelable member 10. In addition, pressure is applied from the above by the user. Thus, added peel force is necessary. The part of the peelable member 10 where the peelable member 10 starts coming off can be made smaller so that the peel force necessary to start peeling off the peelable member 10 is reduced. Great peel force is required to start peeling off the peelable member 10. Once the peelable member 10 starts coming off, less peel force is necessary.

The following describes the assembly of the attached member 1. The assembly of the attached member 1 involves, for example, Steps (1) to (3), which are described below.

(1) First, the region that is part of the first main surface of the strip-shaped peelable member 10 being in film form and corresponds to about one-half the peelable member 10 on the first end side is coated in advance with a release agent, and the adhesive surface 25 of the deep body thermometer 100 is then attached to the coated region.

(2) Subsequently, the tab 20 is attached with the double-sided tape 15 to the region being part of the second main surface of the peelable member 10 and corresponding to about one-half the peelable member 10 on the second end side.

(3) The peelable member 10 is then folded (bent) substantially along the midsection between the first end and the second end of the peelable member 10.

Consequently, the attached member 1 exhibits a layered structure in which the order of layers, closest from the adhesive surface 25, is the peelable member 10, the tab 20, the double-sided tape 15, and then the peelable member 10. These steps may be performed in a different order (e.g., in the order of Step (2), Step (3), and then Step (1)).

Before the attached member 1 assembled as described above is peeled away from the adhesive surface 25 of the deep body thermometer 100, the deep body thermometer 100 is to be placed on a body part under measurement, that is, on a target site on the surface of the body of a person subject to measurement. In other words, the user is to decide where to stick the deep body thermometer 100. In the state in which the deep body thermometer 100 is positioned on the target site, the user presses down the deep body thermometer 100 with fingers of one hand and pinches the tab 20 with fingers of the other hand. The user then pulls out the tab 20 in a lateral direction to peel the peelable member 10 away from the adhesive surface 25 of the deep body thermometer 100. In this way, the deep body thermometer 100 is stuck on the target site.

As described above in detail, the present embodiment involves the following features. The attached member 1 includes: the peelable member 10, which is in film form and is strip-shaped; and the tab 20, which is in plate form. The adhesive surface 25 of the deep body thermometer 100 is attached to the region being part of the first main surface of the peelable member 10 and corresponding to about one-half the peelable member 10 on the first end side. The tab 20 is attached to the region being part of the second main surface of the peelable member 10 and corresponding to about one-half the peelable member 10 on the second end side. With the peelable member 10 being folded substantially along the midsection between the first end and the second end of the peelable member 10, the attached member 1 exhibits a layered structure in which the order of layers, closest from the adhesive surface 25 of the deep body thermometer 100, is the peelable member 10, the tab 20, the double-sided tape 15, and then the peelable member 10. Owing to this configuration, the user can peel the peelable member 10 away from the adhesive surface 25 to stick the deep body thermometer 100 on the target site just by pinching and pulling out the tab 20 in a lateral direction while pressing down the deep body thermometer 100 positioned on the target site.

The thickness of the tab 20 is equal to or greater than twice the minimum bending radius at which the peelable member 10 is elastically deformable. This feature, in particular, eliminates or reduces the possibility that the peelable member 10 will be elastically deformed while being peeled off. Thus, the peelable member 10 may be peeled off with relatively weak force. The tab 20 extends in the folding direction of the peelable member 10 and beyond the outer edge of the peelable member 10. Owing to this feature, the user can easily pinch the tab 20. When removing the peelable member 10 to stick the deep body thermometer 100 on a living body, the user can thus easily peel off the peelable member 10 in the state in which the deep body thermometer 100 is positioned on the target site. In this way, the present disclosure enables reliable affixation of the deep body thermometer 100 to the target site.

With clothes on, the user can in particular slip the deep body thermometer 100 in the present embodiment, for example, under the collar and easily stick it, without necessarily mispositioning, on the body surface under the clothes. This holds true for the case where the deep body thermometer 100 is accommodated in a rigid housing.

In the present embodiment, the length of the tab 20 is substantially equal to or greater than the length in the folding direction of the peelable member 10 in the folded state, and the width of the tab 20 is substantially equal to the dimension of the peelable member 10 in the direction orthogonal to the folding direction of the peelable member 10. Substantially equal means that the length of the tab 20 can be up to 20% longer or shorter than the length in the folding direction of the peelable member 10 in the folded state. These features enable uniform application of force to the folded section, making the peelable member 10 less prone to wrinkle and easy to peel off.

In the present embodiment, the width of the adhesive surface 25 at a position adjacent to the folded section of the peelable member 10 is less than the width the adhesive surface 25 at the midsection thereof. This feature enables a reduction in the peel force necessary to start peeling off the peelable member 10.

In the present embodiment, a release agent may, for example, be applied between the peelable member 10 and the adhesive surface 25 of the deep body thermometer 100 so that the adhesive force acting between the peelable member 10 and the adhesive surface 25 of the deep body thermometer 100 is adjusted to be weaker than the adhesive force acting between the peelable member 10 and the tab 20. This feature enables the user to peel off the peelable member 10 with relatively weak force and eliminates or reduces the possibility that the peelable member 10 will leave a residue on the adhesive surface 25.

First Modification

Figure 4:
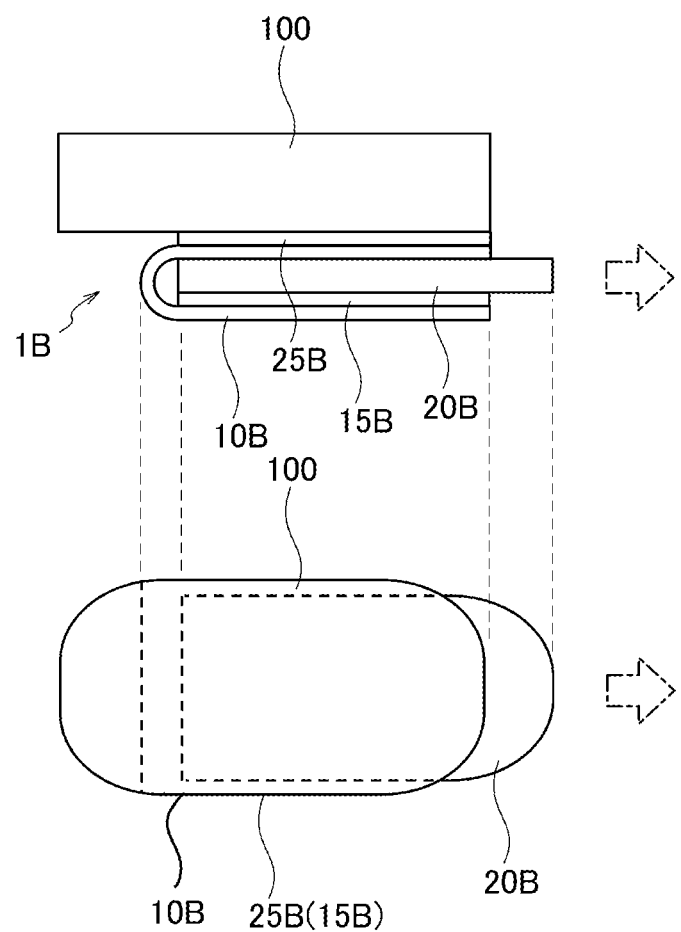
FIG. 4 includes a side view and a plan view of an attached member according to a first modification, illustrating the state in which the attached member is folded over.

In the embodiment above, the folded section of the peelable member 10 extends beyond the outer edge of the deep body thermometer 100. In an alternative configuration, which is illustrated in FIG. 4, the folded section of a peelable member 10B is located on the inner side with respect to the outer edge of the deep body thermometer 100 when viewed in plan (in a direction perpendicular to the first main surface of the peelable member 10). FIG. 4 includes a side view and a plan view of an attached member 1B according to a first modification, illustrating the state in which the attached member 1B is folded over.

When there is a crease in the folded section of the peelable member 10B, relatively strong tensile force is required. In the first modification, meanwhile, the folded section of the peelable member 10B does not extend beyond the outer edge of the deep body thermometer 100 and is less likely to be creased accordingly, thus eliminating or reducing the need for such strong tensile force. The attached member 1B is otherwise identical or similar to the attached member 1 according to the embodiment above and will not be further elaborated here.

Second Modification

Figure 5:
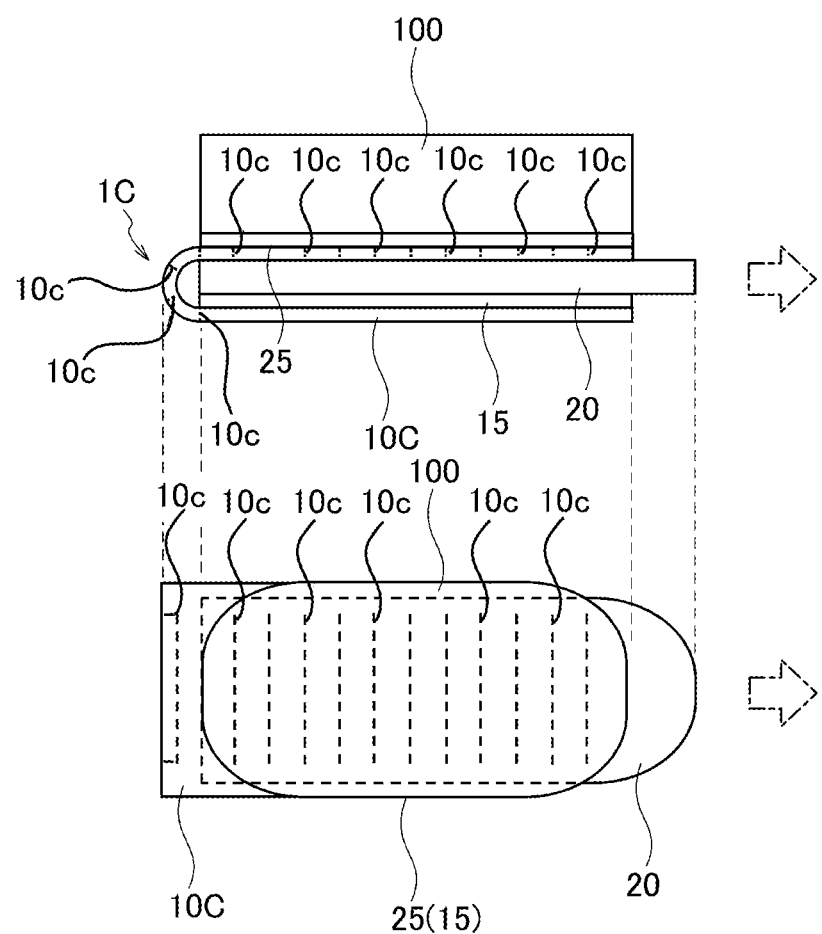
FIG. 5 includes a side view and a plan view of an attached member according to a second modification, illustrating the state in which the attached member is folded over.

In the embodiment above, the peelable member 10 has a reduced thickness so that the minimum bending radius of the peelable member 10 is small. In an alternative configuration, which is illustrated in FIG. 5, a first main surface of a peelable member 10C has a plurality of cuts (half slits) 10c extending in a direction perpendicular to the bending direction and having a spacing smaller than the thickness of the tab 20. FIG. 5 includes a side view and a plan view of an attached member 1C according to a second modification, illustrating the state in which the attached member 1C is folded over. The first main surface and/or a second main surface of the peelable member 10C may have a plurality of cuts 10c. The cuts 10c may be formed in such a manner as to extend in a direction that is not perpendicular to the bending direction of the peelable member 10C. The peelable member 10 having the cuts 10c may be replaced with a plurality of narrow, strip-shaped peelable members 10C aligned and fixed in place with a thin tape.

The second modification enables easy bending and straightening of a rigid material, which may be used as the peelable member 10C. The peelable member 10C may be thus peeled off with a weaker force. The attached member 1C is otherwise identical or similar to the attached member 1 according to the embodiment above and will not be further elaborated here.

Third Modification

In the embodiment above, the tab 20 is not joined to the region being part of the second main surface of the peelable member 10 and corresponding to about one-half the peelable member 10 on the first end side. In this case, the tab 20 and the region corresponding to about one-half the peelable member 10 on the second end side may accidentally come off and dangle from the folded portion. Dangling of the tab 20 can be averted by attaching the tab 20 to the deep body thermometer 100 side.

Figure 6:
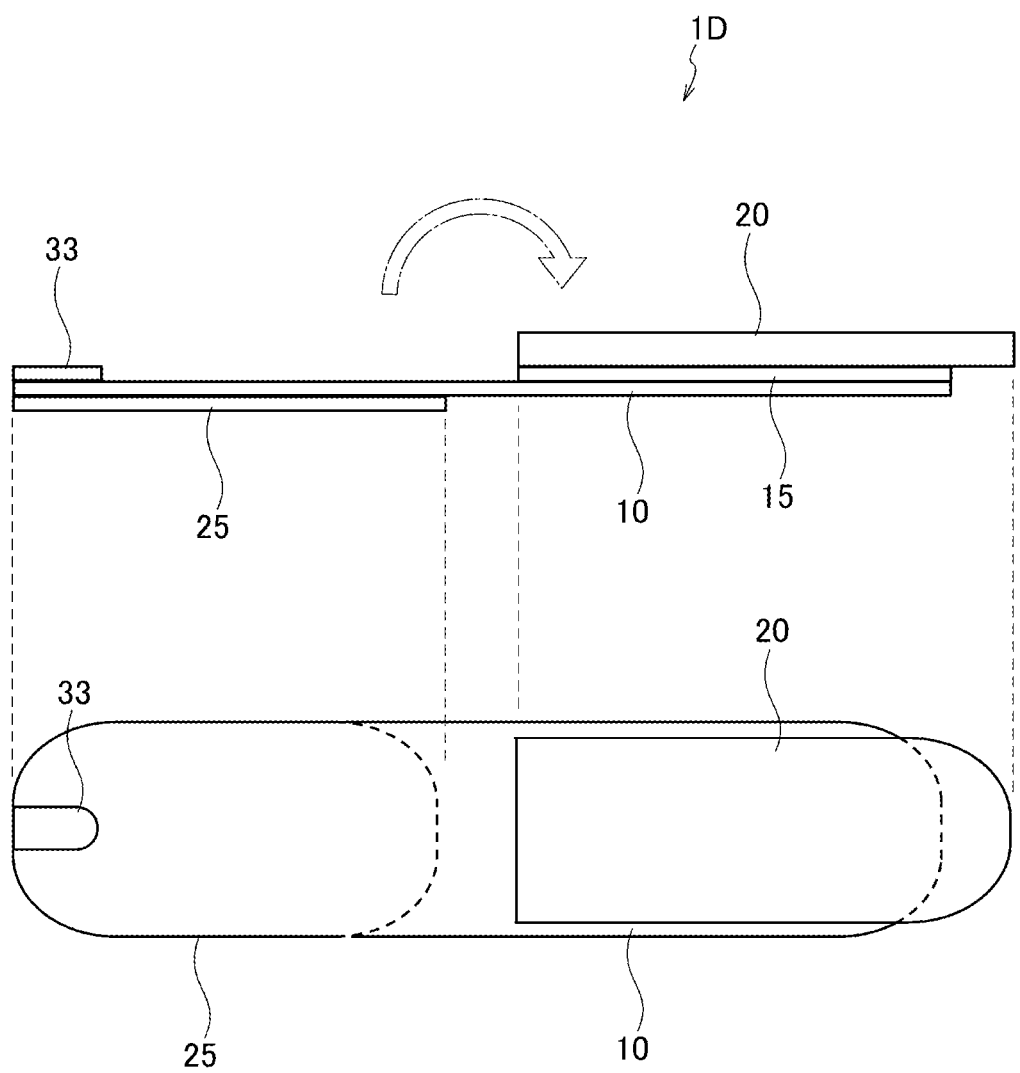
FIG. 6 includes a side view and a plan view of an attached member according to a third modification, illustrating the state in which the attached member is yet to be folded over.
Figure 7:
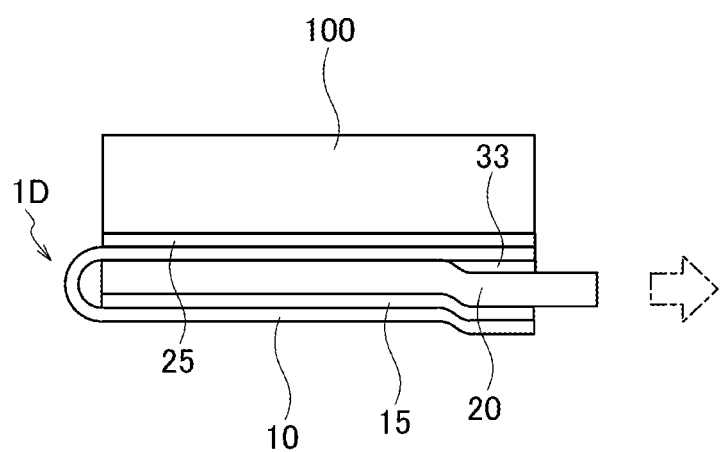
FIG. 7 is a side view of the attached member according to the third modification, illustrating the state in which the attached member is folded over.

For example, an adhesive piece 33 having weak adhesive strength and being in film form, or more specifically, a small piece of double-sided tape can be disposed, as illustrated in FIGS. 6 and 7, on a first end portion of the peelable member 10, where the adhesive piece 33 is located between the first end portion and the tab 20 in the state in which the peelable member 10 is folded over. The adhesive piece 33 may be replaced with a coat of an adhesive agent. FIG. 6 includes a side view and a plan view of an attached member 1D according to a third modification, illustrating the state in which the attached member 1D is yet to be folded over. FIG. 7 is a side view of the attached member 1D according to the third modification, illustrating the state in which the attached member 1D is folded over.

In the third modification, the tab 20 is attached to the deep body thermometer 100 side via the adhesive piece 33. Consequently, dangling of the tab 20 is averted and ease of handling is achieved accordingly. The adhesive piece 33 has relatively weak adhesive strength and may be thus easily removed by pulling the tab 20. The attached member 1D is otherwise identical or similar to the attached member 1 according to the embodiment above and will not be further elaborated here.

Fourth Modification

Figure 8:
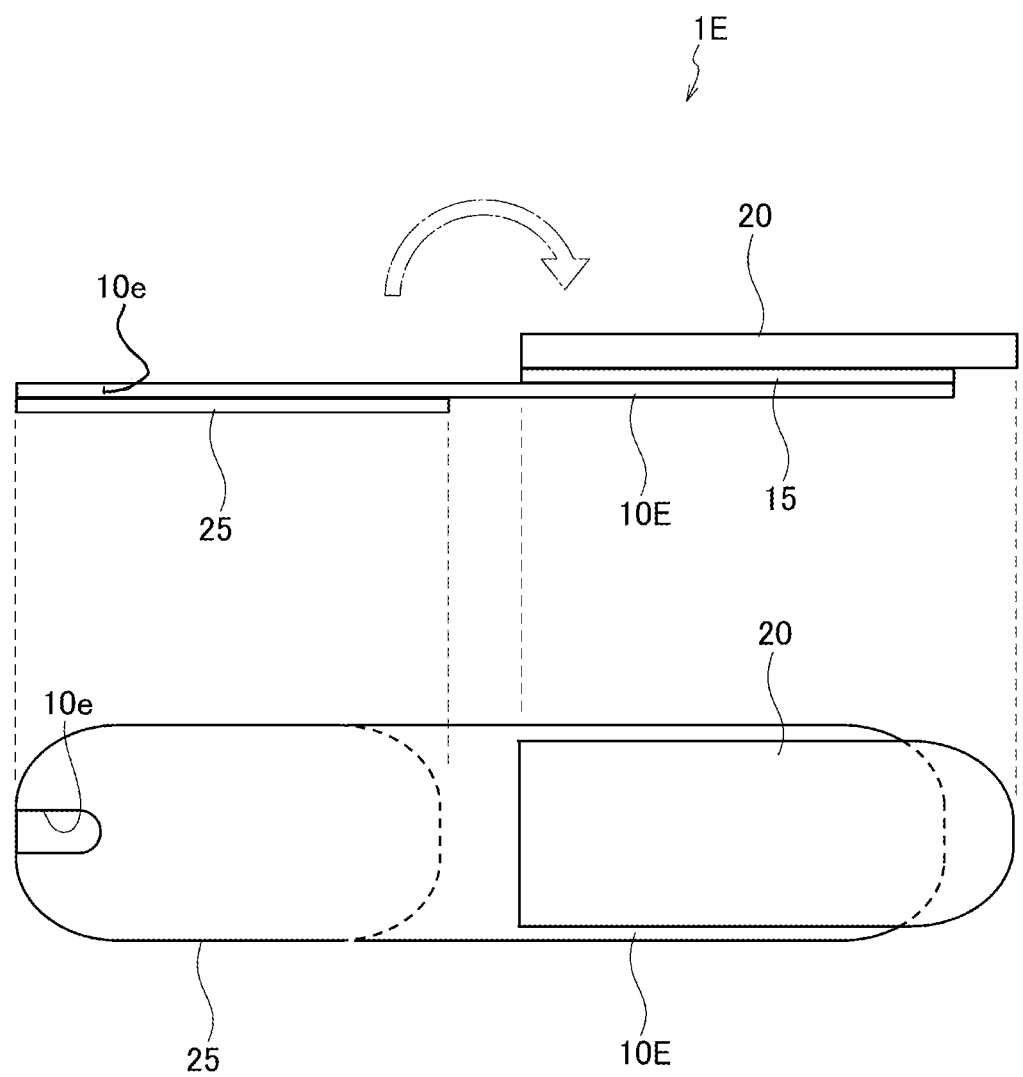
FIG. 8 includes a side view and a plan view of an attached member according to a fourth modification, illustrating the state in which the attached member is yet to be folded over.
Figure 9:
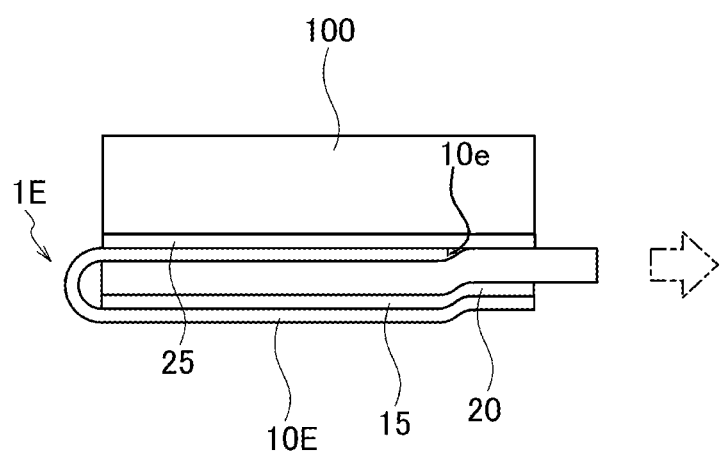
FIG. 9 is a side view of the attached member according to the fourth modification, illustrating the state in which the attached member is folded over.

In the third modification, the tab 20 is attached to the deep body thermometer 100 side via the adhesive piece 33 interposed therebetween so that dangling of the tab 20 is averted. In an alternative configuration, which is illustrated in FIGS. 8 and 9, a first end portion of a peelable member 10E has a cutout 10e, and the tab 20 is attached to the adhesive surface 25 of the deep body thermometer 100 through the cutout 10e in the state in which the peelable member 10E is folded over. FIG. 8 includes a side view and a plan view of an attached member 1E according to a fourth modification, illustrating the state in which the attached member 1E is yet to be folded over. FIG. 9 is a side view of the attached member 1E according to the fourth modification, illustrating the state in which the attached member 1E is folded over. The tab 20 can be coated with a release agent.

In the fourth modification, the tab 20 is attached to the deep body thermometer 100 side through the cutout 10e. Consequently, dangling of the tab 20 is averted and ease of handling is achieved accordingly. Because of the relatively weak bonding, the tab 20 can be easily separated when being pulled out. The attached member 1E is otherwise identical or similar to the attached member 1 according to the embodiment above and will not be further elaborated here. In place of the cutout 10e, a through-hole may be made.

Fifth Modification

Figure 10:
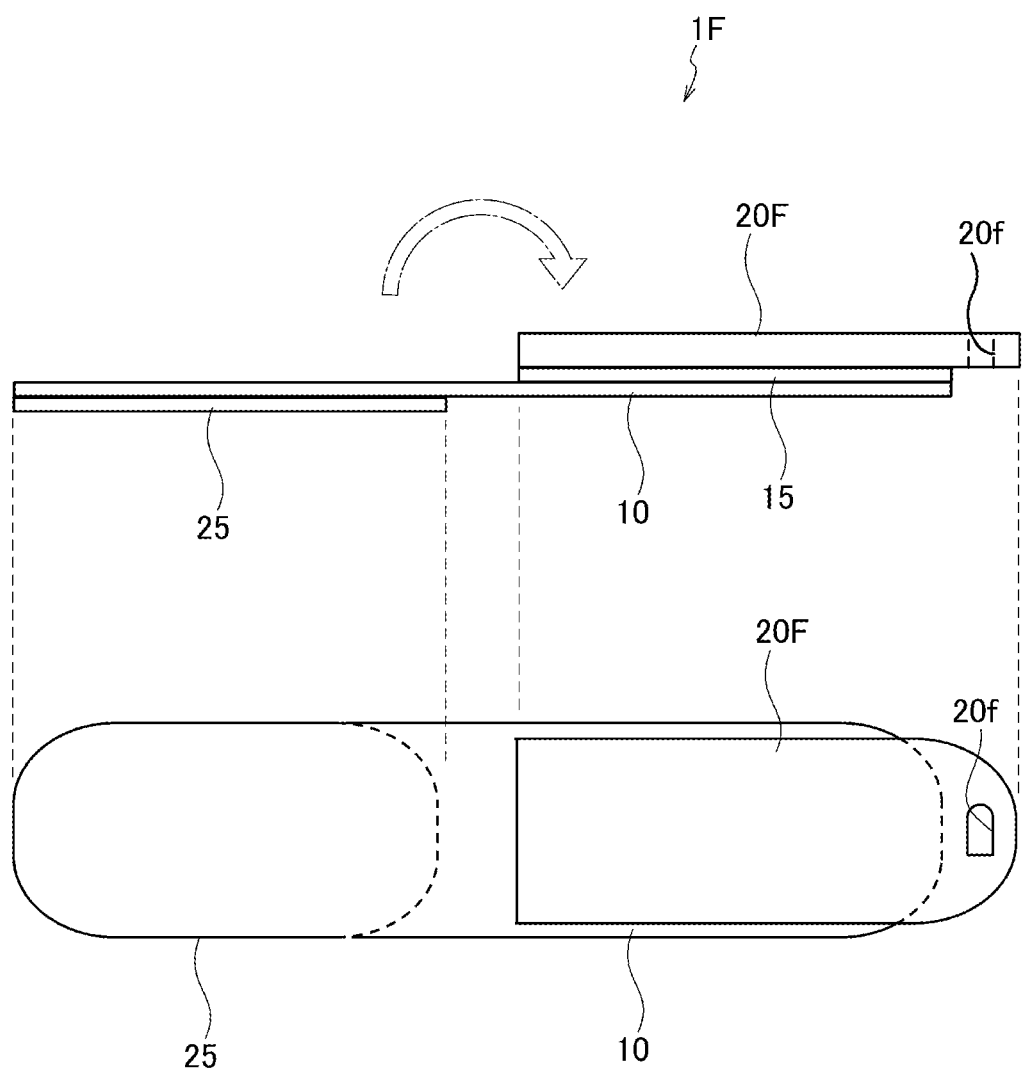
FIG. 10 includes a side view and a plan view of an attached member according to a fifth modification, illustrating the state in which the attached member is yet to be folded over.
Figure 11:
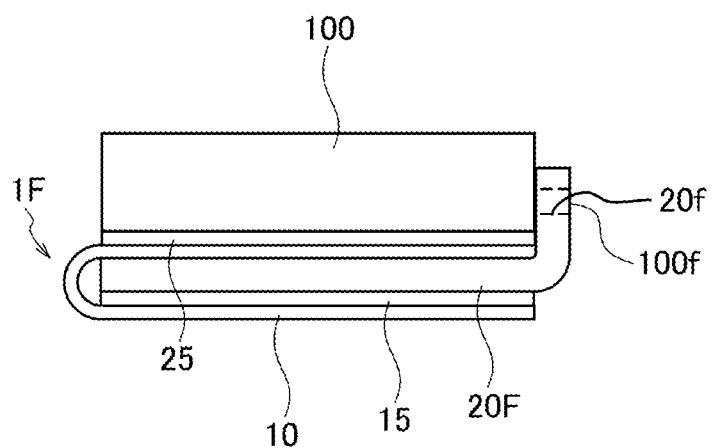
FIG. 11 is a side view of the attached member according to the fifth modification, illustrating the state in which the attached member is folded over.

In the third modification, the tab 20 is attached to the deep body thermometer 100 side via the adhesive piece 33 interposed therebetween so that dangling of the tab 20 is averted. In an alternative configuration, which is illustrated in FIGS. 10 and 11, a side surface of a deep body thermometer 100F has a protruding portion 100f formed thereon and an end portion of a tab 20F has a through-hole 20f. The protruding portion 100f of the deep body thermometer 100F is engaged in the through-hole 20f of the tab 20F in the state in which the peelable member 10 is folded over. In this case, the through-hole 20f can be asymmetrical so that the tab 20F will not be attached inside out. For example, a substantially semicircular through-hole or two holes, namely, a substantially circular through-hole and a substantially rectangular through-hole can be provided. FIG. 10 includes a side view and a plan view of an attached member 1F according to a fifth modification, illustrating the state in which the attached member 1F is yet to be folded over. FIG. 11 is a side view of the attached member 1F according to the fifth modification, illustrating the state in which the attached member 1F is folded over.

In the fifth modification, the tab 20F is fixed to the deep body thermometer 100F side, for example, by engagement. Consequently, dangling of the tab 20F is averted and ease of handling is achieved accordingly. The tab 20F, which is fixed solely by engagement, can be easily released. The attached member 1F is otherwise identical or similar to the attached member 1 according to the embodiment above and will not be further elaborated here.

An embodiment and modifications thereof have been described so far. It should be noted that the present disclosure is not limited to the embodiment and modifications above and various alterations may be made. For example, the peelable member 10 and the tab 20, which have been described as separate members, may be formed as one member while having different thicknesses.

In the embodiment and modifications above, application examples in which the object for affixation is the deep body thermometer 100 have been described. The present disclosure is also applicable to wearable devices other than the deep body thermometer 100.

While embodiments of the disclosure have been described above, it is to be understood that variations and modifications will be apparent to those skilled in the art without necessarily departing from the scope and spirit of the disclosure. The scope of the disclosure, therefore, is to be determined solely by the following claims.

What is claimed is:

1. An attached member attached to an adhesive surface of an object for affixation in such a manner as to cover the adhesive surface and be peelable from the adhesive surface, the attached member comprising:

a peelable member that is in film form and is strip-shaped, the adhesive surface of the object for affixation being attached to a region being part of a first main surface of the peelable member and extending from a first end of the peelable member to a first predetermined position on the peelable member; and a tab that is in plate form and is attached to a region being part of a second main surface of the peelable member and having a portion thereof extending from a second end of the peelable member to a second predetermined position on the peelable member, wherein with the peelable member being folded along a region between the first predetermined position and the second predetermined position, the attached member seen from a direction parallel to the first main surface exhibits a layered structure in which an order of layers, from closest to the adhesive surface of the object for affixation, is the peelable member, the tab, and then the peelable member, and a distal end of the tab extends in a folding direction of the peelable member and beyond an outer edge of the peelable member.

2. The attached member according to claim 1, wherein a length of the tab is substantially equal to or greater than a length in the folding direction of the peelable member in a folded state.

3. The attached member according to claim 1, wherein a width of the tab is substantially equal to a width of the peelable member in the direction orthogonal to the folding direction of the peelable member.

4. The attached member according to claim 1, wherein a width of the adhesive surface at a position adjacent to a folded section of the peelable member is less than a width of the adhesive surface at a midsection thereof.

5. The attached member according to claim 1, wherein adhesive force acting between the peelable member and the adhesive surface of the object for affixation is weaker than adhesive force acting between the peelable member and the tab.

6. The attached member according to claim 5, wherein a release agent is applied between the peelable member and the adhesive surface of the object for affixation.

7. The attached member according to claim 1, wherein a folded section of the peelable member is located on an inner side with respect to an outer edge of the object for affixation when viewed in plan.

8. The attached member according to claim 1, wherein on the first main surface, on the second main surface, or on both the first main surface and the second main surface, the peelable member has a plurality of cuts.

9. The attached member according to claim 8, wherein the plurality of cuts extend in a direction perpendicular to the folding direction of the peelable member.

10. The attached member according to claim 1, wherein an adhesive is disposed on a first end portion of the peelable member, the adhesive being located between the first end portion and the tab in a state in which the peelable member is folded over.

11. The attached member according to claim 1, wherein a first end portion of the peelable member has a cutout or a through-hole, the tab being attached to the adhesive surface of the object for affixation through the cutout or the through-hole in a state in which the peelable member is folded over.

12. The attached member according to claim 1, wherein
a side surface of the attached member has a protruding portion formed thereon,
an end portion of the tab has a through-hole, and
the protruding portion is engaged in the through-hole in a state in which the peelable member is folded over.

13. The attached member according to claim 1, wherein the object for affixation is a wearable device that is to be worn on a living body.

14. The attached member according to claim 1, wherein the object for affixation is a stick-on thermometer that is to be stuck on a living body to measure a temperature of the living body.

15. The attached member according to claim 2, wherein a width of the tab is substantially equal to a width of the peelable member in the direction orthogonal to the folding direction of the peelable member.

16. The attached member according to claim 2, wherein a width of the adhesive surface at a position adjacent to a folded section of the peelable member is less than a width of the adhesive surface at a midsection thereof.

17. The attached member according to claim 3, wherein a width of the adhesive surface at a position adjacent to a folded section of the peelable member is less than a width of the adhesive surface at a midsection thereof.

18. The attached member according to claim 2, wherein adhesive force acting between the peelable member and the adhesive surface of the object for affixation is weaker than adhesive force acting between the peelable member and the tab.

19. The attached member according to claim 3, wherein adhesive force acting between the peelable member and the adhesive surface of the object for affixation is weaker than adhesive force acting between the peelable member and the tab.

20. The attached member according to claim 4, wherein adhesive force acting between the peelable member and the adhesive surface of the object for affixation is weaker than adhesive force acting between the peelable member and the tab.

* * * * *